FUSEHOLDER CONTAINING PILOT LIGHT AND SWITCH

Filed Sept. 29, 1965 3 Sheets-Sheet 1

INVENTOR.

WILLIAM C. LINTON,

Linton & Linton

ATTORNEYS.

Feb. 14, 1967 W. C. LINTON 3,304,391

FUSEHOLDER CONTAINING PILOT LIGHT AND SWITCH

Filed Sept. 29, 1965 3 Sheets-Sheet 2

INVENTOR.
WILLIAM C. LINTON,

Linton & Linton
ATTORNEYS.

Feb. 14, 1967 W. C. LINTON 3,304,391

FUSEHOLDER CONTAINING PILOT LIGHT AND SWITCH

Filed Sept. 29, 1965 3 Sheets-Sheet 3

INVENTOR.
WILLIAM C. LINTON,
Linton & Linton
ATTORNEYS.

United States Patent Office 3,304,391
Patented Feb. 14, 1967

3,304,391
FUSEHOLDER CONTAINING PILOT LIGHT AND SWITCH

William C. Linton, Bethesda, Md., assignor to Fuse Indicator Corporation, Rockville, Md., a corporation of Maryland Filed Sept. 29, 1965, Ser. No. 491,213
12 Claims. (Cl. 200—121)

The present invention relates to electrical fusible units having for its principal object to either combine a fuseholder and pilot light or to combine fuseholder, pilot light and central switch arranged in a compact manner in a single block or casing capable of being mounted upon a panel board so as to provide a one load center for switching all circuits, including branch circuits, visible indication for all circuits, visible blown fuse indication and a non-tampering fuseholder all readily visible for inspection from the panel mounting without the need to remove any one of the units or disconnect any circuit.

Other objects will be in part obvious and in part pointed out as the description continues.

The fuses employed herein are Standard National Electrical Code approved type SC each having the same ferrule diameters of 13⁄32 of an inch but of different lengths as follows: 15 ampere 1 15⁄16"; 20 amperes 1 13⁄32"; 30 amperes 1⅝" and 60 amperes 2¼" each having a 300 volt rating, but can be used on any circuit of between 120 and 450 volts.

Figures 10, 11, 12, 13, 14, 15, 16, 17, 18, 19, 20, 30:
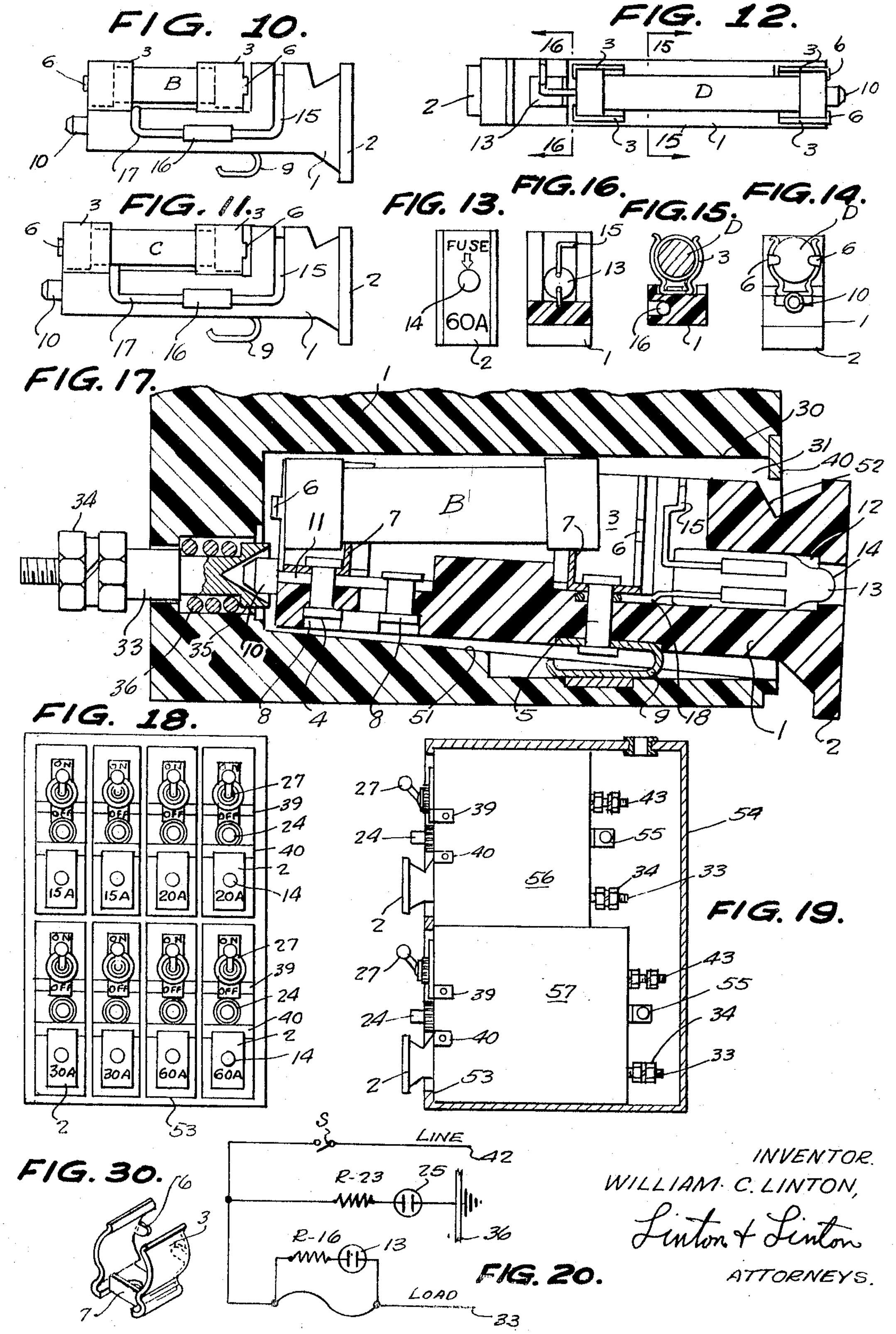
FIG. 10 is a side elevation of a fuse carrier with a 20 ampere fuse supported therein.
FIG. 11 is another side elevation of a fuse carrier with a 30 ampere fuse supported therein.
FIG. 12 is a top plan view of a fuse carrier having a 60 ampere fuse supported therein.
FIG. 13 is a front elevation of the same.
FIG. 14 is a rear elevation of the same.
FIG. 15 is a vertical transverse sectional view taken on the line 15—15 of FIG. 12.
FIG. 16 is another transverse sectional view taken on the line 16—16 of FIG. 12 in the direction of the arrow points.
FIG. 17 is a greatly enlarged vertical sectional view through the fuseholder mounted within the unit housing and the latter being only partially shown.
FIG. 18 is a front elevation of a panel board illustrating how many of the fuse units may be mounted thereon in stacked formation.
FIG. 19 is a sectional view of the control box for supporting the panel board shown in FIG. 18.
FIG. 20 is a schematic diagram of the electrical circuit for each fuse unit.
FIG. 30 is a perspective view of the fuse clip.

The fuse carrier assembly comprises a base 1 having knob 2 formed at one end thereof both molded in one piece from insulating material. The fuse clips 3 are identical in construction and are retained upon the base 1 in spaced relation by means of the rivets 4 and 5. Each spring arm of a fuse clip have formed therewith the stop tabs 6 for preventing the longitudinal sliding movement of the fuse when supported therein. Each clip has a vertically projecting tab 7 formed with the base thereof. The rivet 4 may be inserted and retained in three different openings 8 formed with the base 1 so that the clip 3 secured thereby can be adjusted along the base 1 to accommodate the various lengths of the 15, 20 and 30 ampere fuses as is best illustrated in FIG. 17 of the drawings. Connected to the base 1 by rivet 5 is a leaf spring contact 9, and a stationary tapered contact 10 extends from the rear end of the base 1 having a flat extension 11 that is fitted in a recess in the top of the base 1 and connected to the latter by means of the rivet 4. The knob 2 of the carrier base has a recess 12 formed therein receiving the neon glow lamp 13 whereby the light rays emitted therefrom may be sighted through the opening 14 in the knob 2. One lead wire 15 of this lamp is connected to the resistor 16 and the wire 17 from resistor 16 has a soldered connection to the rear fuse clip 3 retained upon the base 1 by means of the rivet 4. The other lead wire 18 from the lamp 13 is connected to the forward fuse clip by means of the rivet 5. From the foregoing it will be understood that when current is supplied to the contacts 9 and 10 of the carrier assembly it will pass through the fuse connected to the clips 3 but when a fuse blows the lamp 13 will glow as the latter is connected in parallel to the fuse, but in series with the terminals 9 and 10.

Figures 1, 4, 5, 6:
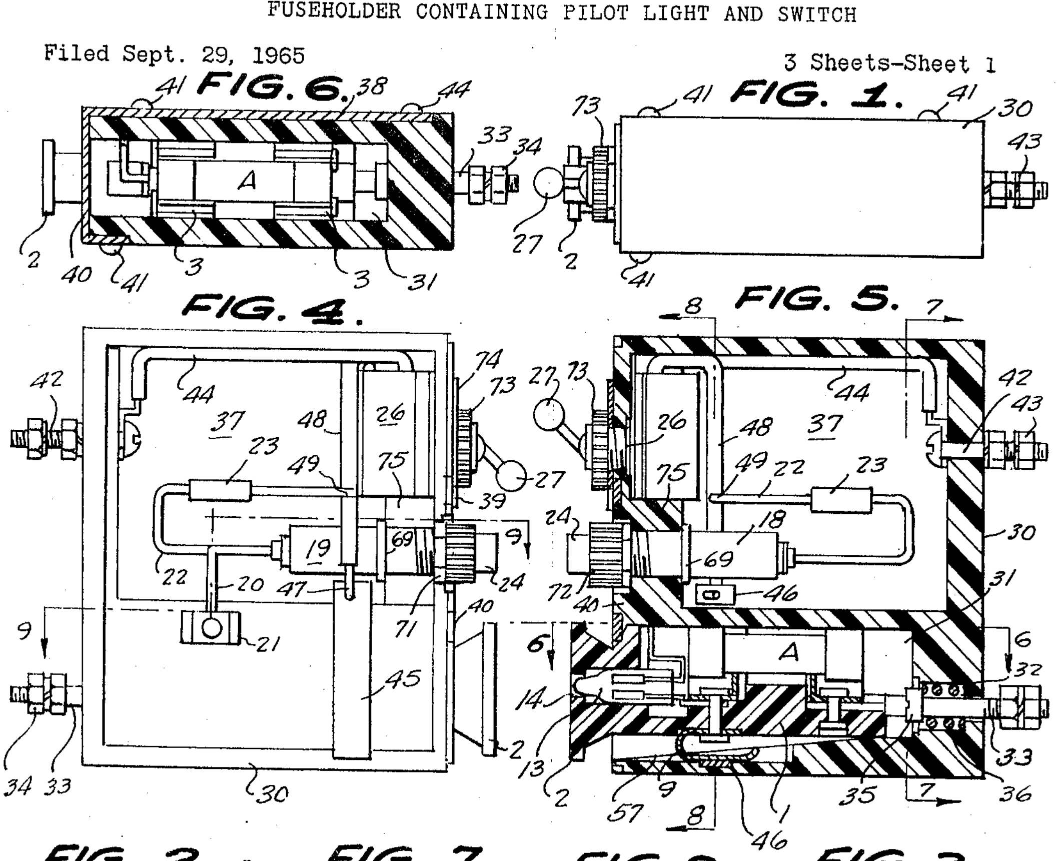
FIG. 1 is a top plan view of one of the complete fuse units having a fuseholder, pilot light and central switch housed therein.
FIG. 4 is a side plan view with the cover removed.
FIG. 5 is a vertical transverse sectional view.
FIG. 6 is a horizontal section taken on the line 6—6 of FIG. 5 in the direction of the arrow points.

The fuse carrier assembly as illustrated in FIG. 5 is of a length as to carry only a 15 ampere fuse A; the fuse carrier assembly as shown in FIG. 10 carries only a 20 ampere fuse B; the fuse carrier assembly as shown in FIG. 11 carries only a 30 ampere fuse C and FIGS. 13–16 inclusive illustrate a fuse carrier assembly which carries only a 60 ampere fuse D. The fuse carrier assembly as illustrated in FIG. 17 of the drawings may carry either one of the fuses A, B, or C.

Figures 25, 26, 27, 28:
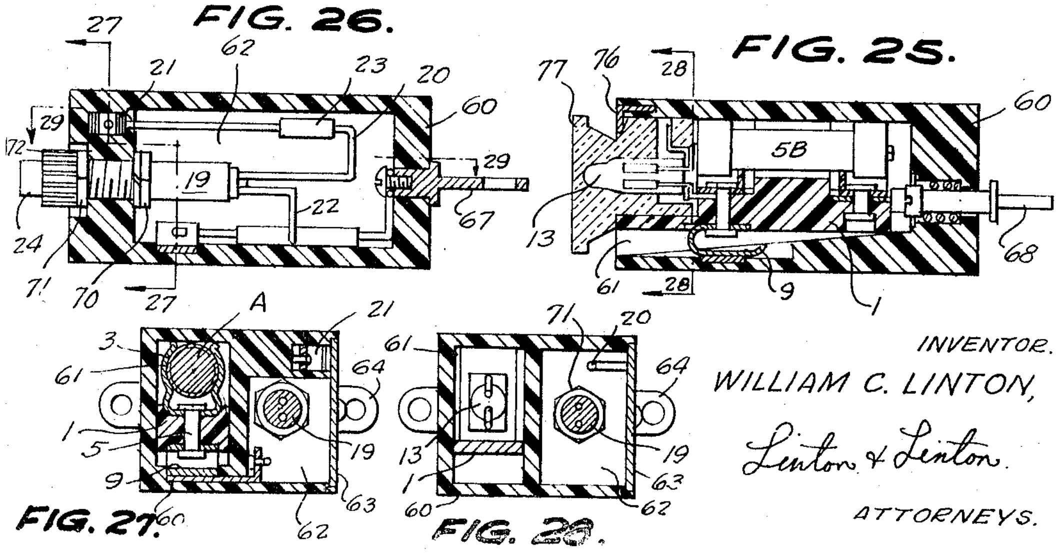
FIG. 25 is a vertical longitudinal sectional view taken on the line 25—25 of FIG. 22 in the direction of the arrow points.
FIG. 26 is another vertical longitudinal section view taken on the line 26—26 of FIG. 22.
FIG. 27 is a vertical transverse sectional view taken on the line 27—27 of FIG. 26 in the direction of the arrow points.
FIG. 28 is a vertical transverse sectional view taken on the line 28—28 of FIG. 25 in the direction of the arrow points.

The pilot lamp assembly comprises a cylindrical base 19 having a conductor wire 20 leading to the spring contact clip 21 and another wire 22 having a resistor 23 included therein. For convenience the resistor 23 may be included in the wire 20 as shown in FIG. 26. A lamp holder provided with a transparent knob 24 houses a neon lamp 25 and is detachably inserted within the opened end of the base 19 as known in commercial pilot lamp holders.

The controls switch assembly may be of any preferred commercial design but as herein shown comprises a base 26 of the toggle design from which extends a threaded projection in the latter of which is mounted the lever 27 of the switch.

Figures 2, 3, 7, 8:
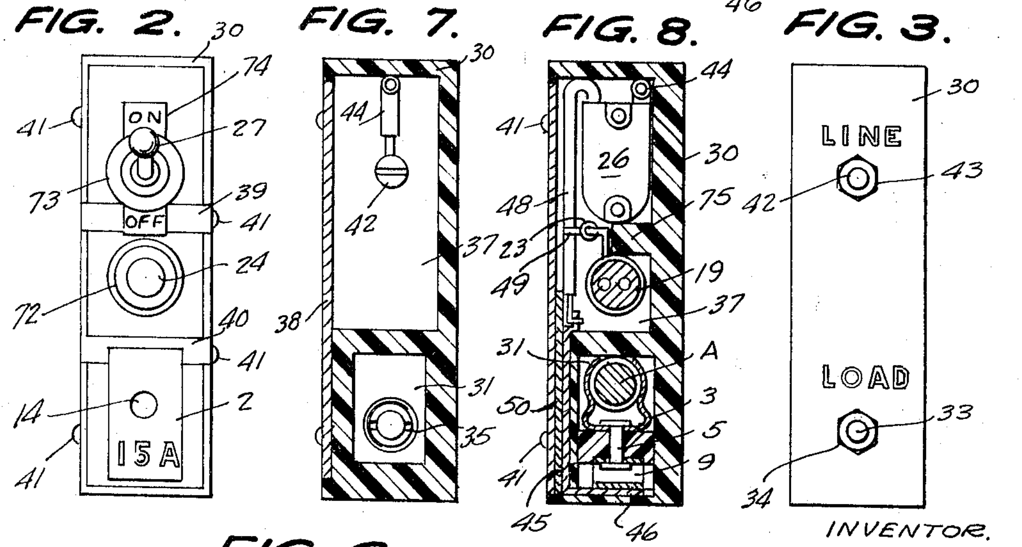
FIG. 2 is a front elevation.
FIG. 3 is a rear elevation.
FIG. 7 is a vertical transverse sectional view taken on line 7—7 of FIG. 5.
FIG. 8 is another vertical transverse sectional view taken on the line 8—8 of FIG. 5.

The casing 30 is preferably molded from insulating materials having an opened end recess 31, rectangular shaped in cross section, and extending longitudinally adjacent a lower end thereof for receiving the fuse carrier assembly. An opening 32 extending through the rear wall of the casing is to receive a sliding bolt terminal 33 having a threaded outer end for the lockwasher and hex nuts 34 whereby a conductor cable may be connected thereto. The opposite end of this bolt has an enlarged recessed end 35 formed therewith for receiving the contact 10 of the carrier base assembly. This bolt is spring pressed against the contact 10 by means of the coil spring 36. Another cavity 37 is formed in the upper part of this casing which is opened as one side of the latter and this opened end of the cavity is closed by means of a metal cover plate 38. Formed with one end of this plate are the spaced straps 39 and 40 which extend over the forward end of the casing as best illustrated in FIG. 2 of the drawings. These straps are each attached to one side wall of the casing and the opposite ends of the cover plate 38 are attached to a side wall of the casing by means of drive screws 41. Also extending through the rear wall of the casing is a terminal contact bolt 42 having a lockwasher and hex-nuts 43 connected to the outer end thereof for attaching to this bolt to a suitable conductor cable. The inner end of this bolt extends with the recess 37 and has connected thereto an insulated wire 44 leading from the casing 26 of the toggle switch.

Mounted in a recess formed in a side wall of the casing 30 is a conductor strip 45 having one end extending at right angles thereto for providing a contact 46 for the leaf spring 9 of the fuse carrier base. The opposite or upper end of this conductor strip 45 is bent at right angles thereto and at 47 the other insulated wire 48 leading to the toggle switch housed in the casing 26 is connected thereto. The wire 22 from the pilot light assembly is connected at 49 to the wire 48. A fiber board 50 insulates this conductor strip 45 from the metal cover 38. The current when supplied to the terminal 42 flows to the toggle switch through the conductor 44 and then through the conductor 48 to the conductor strip 45 to the spring contact 9 of the fuse carrier assembly and then through the fuse to the terminal 33. The indicator lamp 13 being connected in parallel with the fuse, but in series with the terminals 34 and 42 so that when the fuse blows this lamp will glow. As the pilot lamp 25 is connected to the conductor wire 48 of the toggle switch this lamp will continuously glow as long as current is supplied to the terminal 42. This pilot light is grounded by its connection to the clip 21 when in contact with the metal plate 38. As the resistor 23 limits the flow of current to the cover plate 28 only about 3 milliamperes of current is received which later is hardly noticeable or a personal hazard to anyone touching the cover.

The lower wall 51 of the cavity 31 formed in the casing is inclined as shown in order that when the fuse carrier assembly is inserted therein the knob contact 10 thereof will be directed to the recessed end 35 of the contact bolt 33 and upon the release of the carrier 1, the inclined wall 52 thereof will be held behind the strip 40 under the pressure of the spring 9 thereby locking the fuse carrier assembly with the casing 30. To release the fuse carrier assembly it is only necessary to manually push down on the knob 2 until the inclined wall 52 passes below the strap 40. The fuse carrier assembly will then be ejected from the casing 30 by means of the coil spring 36 in order that a blown fuse may be replaced.

The non-tampering feature of the present invention resides in limiting the longitudinally sliding movements through the clip 3 by means of the stop tabs 6 and also providing the clip 3 with the leg extension 7 whereby should a fuse of less length than space between the clips be used a ferrule at one end of the fuse will rest upon a leg 7 and thereby cock the fuse to the position as illustrated in FIG. 17 of the drawings. As the cocked end of the ferrule strikes the ceiling wall of the cavity 31, the inclined wall 52 of the knob cannot obtain a rest position behind the strap 40 as to retain the fuse carrier assembly within the casing 30. Should anyone attempt to place the fuse A in the carrier for fuse B as shown in FIG. 10 the fuse A would be caused to assume a cocked position. Likewise should anyone attempt to place the fuse B in the carrier assembly for fuse C as shown in FIG. 11 the fuse B would be caused to assume a cocked position. The fuses B and C are too long to be placed in the carriers assembly of A as shown in FIG. 5 and the tabs 6 of the clips would limit any attempted sliding movement within the clips thereof as to force either B or C therein. The fuses A, B, and C are each too short as to be placed within the clips 3 of the carrier assembly for fuse D as shown in FIG. 12.

The front wall or panel 53 with rectangular shaped openings therein for receiving the front ends of the casings 30 and straps 55 connected to the casing 54 will retain the formed ends of the casing 30 within said rectangular shaped openings. The casing 30 for the A, B, and C fuses when using the carrier base 1 as shown in FIG. 17 will be of the length 56 and the length of the casing for fuse D as indicated as at 57. The FIGS. 18 and 19 of the drawings illustrates how the individual fusable units may be stacked upon one another and of course it is to be understood that only a single row of fusable units may be employed and likewise any member of rows of fusable unit may be stacked one upon the other to meet the requirement of most any control center.

Figures 21, 22, 23, 24, 29:
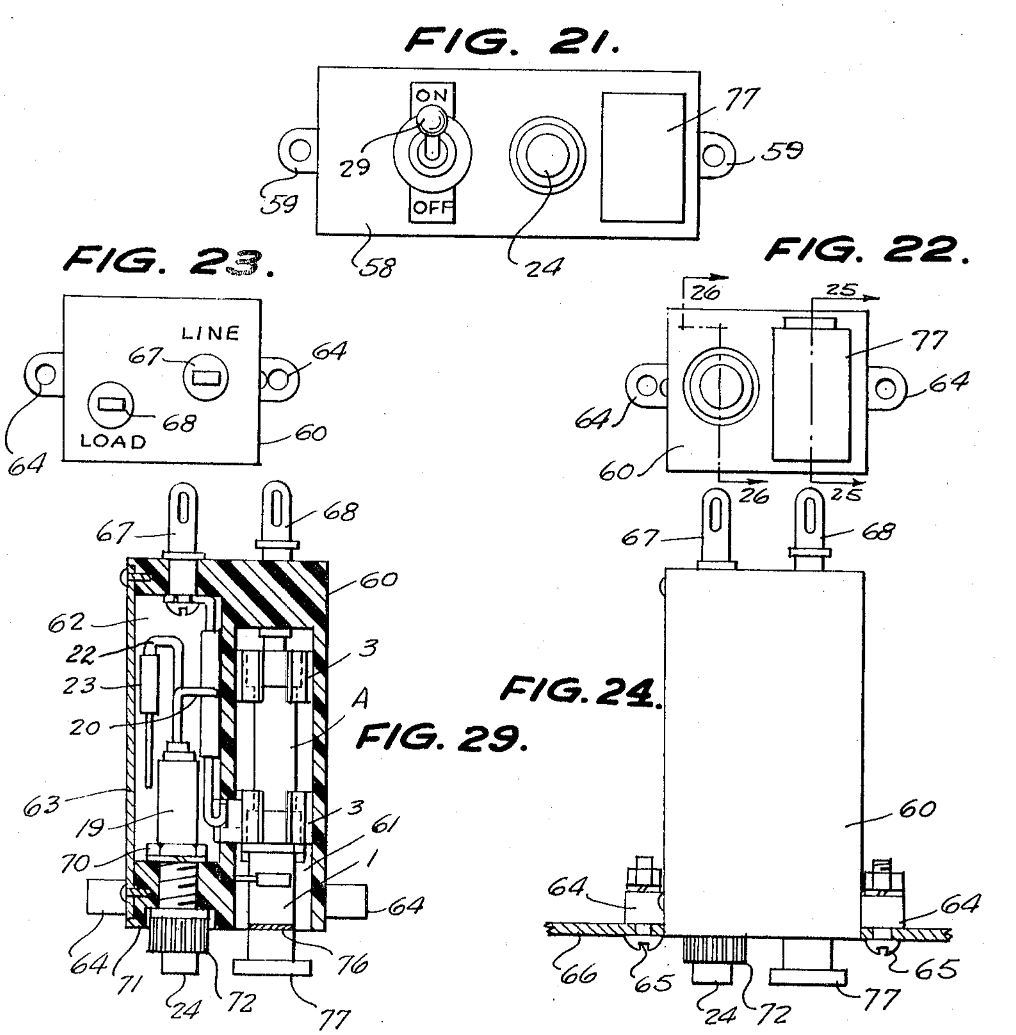
FIG. 21 is a front elevation of a fuse unit composing a central switch, pilot light and fuseholder as housed in a casing for horizontal mounting upon a panel board.
FIG. 22 is a front elevation of a fuse unit employing only a fuseholder and pilot light.
FIG. 23 is a rear elevation of the same.
FIG. 24 is a top plan view.
FIG. 29 is a horizontal sectional view taken on the line 29—29 of FIG. 26 in the direction of the arrow points.

In FIG. 21 of the drawings I have illustrated a control switch, pilot lamp and indicating fuse carrier mounted horizontal within a casing 58 having the apertured ears 59 for screw attachment to a panel board. This single unit may be employed when only a contact switch, pilot lamp and fuseholder is required, but may be employed as a central control unit with units consisting of only a pilot lamp and fuseholder for controlling branch circuits as illustrated in FIGS. 22 to 28 inclusive of the drawings.

The casing 60 is molded from insulating material having a recess 61 opened at the front wall of its caseway for receiving the fuse carrier assembly. Another cavity 62 opened to one side wall of the casing 60 receives the pilot light assembly and the opened end of this cavity is closed by means of the metal cover plate 63. The casing 60 is provided with apertured ears 64 through which extend the bolts 65 for attachment to the panel board 66. The contact terminals 67 and 68 are of the spade type instead of the screw type terminals 33 and 34 mounted on the casing 30.

Figure 9:
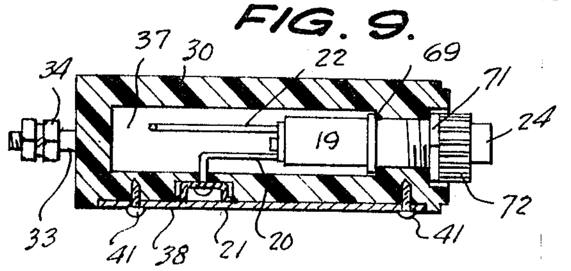
FIG. 9 is a horizontal sectional view taken on the line 9—9 of FIG. 4, in the direction of the arrow points.

The forward wall of each casing 30 and 60 have an opening formed therein communicating with the recesses 37 and 62 respectively for receiving the cylindrical casing 19 of the pilot light assembly. The casing 19 may have an enlarged head 69 formed therewith as best shown in FIG. 9 or a lock nut 70 as best shown in FIG. 26 and a lock nut 71 for retaining and supporting the pilot light assembly to the front wall of these casings. An internally threaded cap 72 engages the outer threaded end of the casing 19 for retaining the lamp holder by its transparent knob 24 within the same.

The threaded end of the toggle switch casing 26 that extends through the opening in the front wall of casing 30 and communicates with the recess 37 therein is provided with a lock nut 73 for retaining the plate 74 and the toggle switch to the casing 30. A shelf 75 is formed with the casing 30 and extends with the recess 37 thereof upon the casing 26 of the toggle switch.

Instead of employing the strap 40 for retaining the fuse carrier assembly with the casing 30, the angular plate 76 is used as molded with the casing 60.

The forward end of the carrier base 1 as shown in FIGS. 21, 22, 23, 24, and 25 of the drawings has secured thereto a transparent knob 77 whereby when the lamp 13 is lighted the entire knob will glow.

I claim:

1. A fuseholder comprising a body of electrical insulting material having an open end recess providing therein, a contact terminal extending within said body recess at the inner end thereof, a second contact terminal extending within said body recess at one side thereof, but in spaced relation with said first mentioned contact terminal, a stop extending within said recess, a fuse carrier of electrical insulating material removably inserted through the open end of said body recess, a plurality of fuse clips secured to said carrier for retaining a fuse thereon, means pivotally connecting said carrier and electrically connecting one of said fuse clips to said first mentioned contact terminal, a contact electrically connected to another of said fuse clips and resilient means positioned on a side of said carrier opposite to said stop detachably retaining said carrier in engagement with said stop for preventing the withdrawal of said carrier from said recess until manually moved from said stop and electrically connecting said contact and said second contact terminal.

2. A fuseholder as claimed in claim 1 wherein said resilient means is fixedly connected to said carrier and slidably mounted on said second contact terminal.

3. A fuseholder comprising a body of electrical insulating material having a recess therein with a closed end and an opposite open end opening at one side of said body, a contact terminal extending through the closed end of said body recess, a stationary contact mounted on a side of said body recess and spaced from said contact terminal, a fuse carrier of electrical insulating material removably mounted in said body recess and having a knob extending from said body recess open end, a pair of fuse clips connected to said carrier for retaining a fuse thereon, means pivotally supporting one end of said carrier on said contact terminal and electrically connecting one of said fuse clips to said contact terminal, carrier retaining means connected to said body and extending within said recess, biasing means tending to pivot said carrier about said contact terminal against said carrier retaining means detachably retaining said carrier in said body recess until said knob is manually moved to release said carrier and detachably connecting said stationary contact electrically to another of said fuse clips.

4. A fuseholder as claimed in claim 3 wherein said contact terminal is a bolt slideably extending in said body and having a tapered recess in the end thereof within said body recess, a spring tends to move said bolt within said body recess, and said pivotal supporting means for said carrier consists of a tapered contact extending from said carrier and seated in said bolt recess.

5. A fuseholder as claimed in claim 3 wherein said carrier retaining means consists of a stop extending within said recess at said recess open end and said biasing means includes a spring contact between said body and said carrier on a side of said carrier opposite said stop.

6. A fuseholder as claimed in claim 3 wherein one of said fuse clips is adjustable longitudinally of said carrier permitting the latter to accommodate cartridge-type fuses of varying lengths.

7. A fuseholder as claimed in claim 3 wherein an indicating lamp is mounted within said knob, a resistor is mounted on the exterior of said carrier and including means for electrically connecting said lamp and resistor in series with said fuse clips, but in parallel to the fuse carried thereby.

8. A fuseholder as claimed in claim 3 wherein the knob extending from said carrier is of electrical insulating material and has a lamp receiving recess formed therein and a light emitting opening connecting with said lamp receiving recess, and said light emitting opening terminating at the outer face of said knob.

9. A holder for protectors for electrical circuits having electrical equipment included therein comprising an electrically non-conducting body, said body being of a rectangular configuration having the outer wall thereof being capable of insertion within a corresponding opening in a panel mounting and connected to the latter, said body having a recess formed therein with an open end terminating with said outer wall of the body, a fuse carrier of electrical insulating material removably inserted within the recess of said body, a knob formed with said carrier extending beyond the panel mounting, an indicating lamp mounted said knob, a stop extending into said recess from said body, an electrical conducting terminal mounted upon said body and extending within the recess thereof, said body having an open end cavity formed therein insulated from the recess thereof, a second electrical conducting terminal mounted upon said body and extending within the cavity thereof, means detachably and electrically connecting the fuse of said carrier in series with said conducting terminals and the lamp of said knob in series with said conducting terminals, but in parallel to the fuse upon said carrier including a spring conductor tending to hold said carrier in engagement with said stop, a pilot lamp mounted within the cavity of said body and having its lens visible from said panel mounting, one lead wire of said pilot lamp being electrically connected to said conducting terminal extending within the recess of said body and the other lead wire of said pilot lamp connected to another electrical conducting terminal extending within the cavity of said body.

10. A holder as claimed in claim 9 wherein a switch mounted within the cavity of said body has an operating knob extending beyond said panel mounting, a conductor for electrically connecting said switch with said terminal extends within the recess of said body and another conductor connects said switch with said second terminal.

11. A holder as claimed in claim 9 wherein the cavity formed within said body has an open end extending through one side wall of this body and a cover closes said open end of the cavity formed in said body.

12. A holder for protectors of electrical circuits having electrical equipment included therein; comprising a rectangular shaped body of electrically non-conducting material and having a recess therein, an indicating fuse carrier removably inserted within said recess formed in said body and having a knob extending beyond one wall of said body, said body having a cavity formed therein arranged above the recess thereof and insulated from the latter, a switch mounted within the cavity of said body and having an operating knob extending from the same wall of said body from which the knob of the fuse carrier extends, a pilot light mounted within the cavity of said body and being visible from the same wall of said body from which extends the operating knob of said switch, a line conductor leading from said switch, an electrical conductor leading from said switch, one lead wire of said pilot lamp being electrically connected to said conductor leading from said switch, the other lead wire from said pilot light being grounded, said conductor leading from said switch extending within the recess formed in said body and being electrically and detachably connected with one terminal of the fuse of said carrier, a ground electrically conducting terminal extending within the recess of said body and means detachably and electrically connecting the other terminal of the carrier fuse to said ground conducting terminal.

References Cited by the Examiner

UNITED STATES PATENTS

| | | | |
|---|---|---|---|
| 2,417,692 | 3/1947 | Kline | 200—121 X |
| 2,471,848 | 5/1949 | VonHoorn | 200—121 |
| 2,581,308 | 1/1952 | Smith | 200—121 X |
| 2,742,545 | 4/1956 | Sundt | 200—129 X |
| 2,758,295 | 8/1956 | Sundt | 200—121 X |
| 2,854,549 | 9/1958 | Duerkob | 200—133 |
| 2,930,961 | 3/1960 | Lezan | 200—117 X |
| 3,045,168 | 7/1962 | Fellendorf | 200—117 X |
| 3,225,163 | 12/1965 | Linton | 200—121 |

BERNARD A. GILHEANY, *Primary Examiner.*

H. GILSON, *Assistant Examiner.*